United States Patent [19]

Maeno et al.

[11] Patent Number: 5,905,587
[45] Date of Patent: May 18, 1999

[54] OPTICAL NETWORK DEVICE

[75] Inventors: Yoshiharu Maeno; Naoya Henmi, both of Tokyo, Japan

[73] Assignee: NEC Corporation, Tokyo, Japan

[21] Appl. No.: 08/857,806

[22] Filed: May 16, 1997

[30] Foreign Application Priority Data

May 16, 1996 [JP] Japan .................................. 8-121613

[51] Int. Cl.$^6$ .................................................. H04J 14/00
[52] U.S. Cl. ........................ 359/117; 359/128; 359/139; 370/360
[58] Field of Search .......................... 359/117–118, 128, 359/158, 139; 370/360, 503

[56] References Cited

U.S. PATENT DOCUMENTS 5,432,627   7/1995   Nishio ..................................... 359/117

OTHER PUBLICATIONS

"Fibre Channel Physical and Signaling Interface (FC–PH)," *ANSI X3T11* (1994) 4.3: 19–20.
Koike, N. "NEC Cenju–3: A Microprocessor–based Parallel Computer," *Proc. IEEE* (1994): 396–401.
Yamada, Y. et al. "Hybrid–Integrated 4x4 Optical Gate Matrix Switch Using Silica–based Optical Waveguides and LD Array Chips," *Journal of Lightwave Technology* (1992) 10:383–389.

*Primary Examiner*—Kinfe-Michael Negash
*Attorney, Agent, or Firm*—Scully, Scott, Murphy & Presser

[57] ABSTRACT

Disclosed is an optical network device for connecting a plurality of processors in a multiprocessor system, which has: a plurality of network interface devices corresponding to the plurality of processors; and an optical switch device; where each of the plurality of network interface devices comprises an optical transmitter and an optical receiver which are connected with the optical switch device through optical fibers and a network interface control circuit, the optical switch device comprises an optical switch connected with the optical transmitter and the optical receiver and an optical switch control circuit, the network interface control circuit and the optical switch control circuit are connected with each other through a transmission request signal line, a transmission-ending signal line and a transmission-start request signal line, the network interface control circuit sends out a transmission request with an addressee address through the transmission request signal line and notifies the optical switch control circuit of an end of data transmission through the transmission-ending signal line, and the optical switch control circuit arbitrates the transmission request, thereafter switching the optical switch and ordering the network interface control circuit to transmit data through the transmission-start request signal line.

9 Claims, 11 Drawing Sheets 200
1x16
SPLITTER

201
SEMICONDUCTOR
OPTICAL
AMPLIFIER 202
16x1
COMBINER

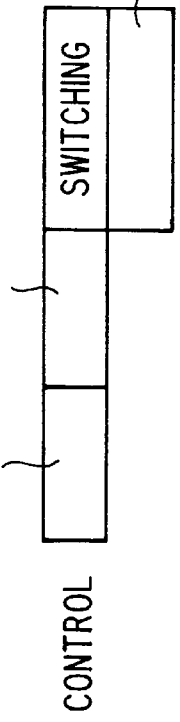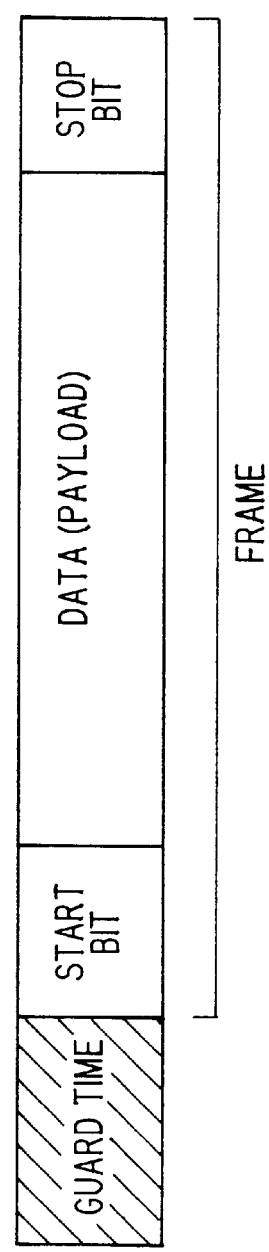
FIG. 10A
FIG. 10B
FIG. 10C

OPTICAL NETWORK DEVICE

FIELD OF THE INVENTION

This invention relates to an optical network device, and more particularly to, an optical network device for connecting processors in a multiprocessor system.

BACKGROUND OF THE INVENTION

Recently, for the purpose of enhancing the throughput of a network, an optical interconnection in which data is transferred as an optical signal in optical fibers, has been introduced to the connection between processors in a multiprocessor system or the connection between a processor and a peripheral equipment such as a disk array. Furthermore, there have been many researches and proposals not only as to point-to-point interconnects but also as to a network for connecting of processors or peripheral equipments with switches.

For example, a network implemented with the Fibre Channel which is a typical optical interconnection standard for computers and an electrical switch called Fabric is described in ANSI X3T11, Fibre Channel Physical and Signaling Interface(FC-PH), Rev 4.3 (1994), pp.19–20.

A conventional optical network device comprises a large number network interface devices connected to processors and a switch device. The network interface includes a network interface control circuit, an optical transmitter, an optical receiver and a FIFO(first-in first-out) queue. The switch device includes an optical receiver, FIFO queues, an electrical switch and an optical transmitter.

Data output from the source network interface device is transmitted through the optical transmitter in the network interface device, the optical fiber, the optical receiver in the switch device, the FIFO queue, the electrical switch, the optical transmitter in the switch device, the optical fiber, the optical receiver in the network interface device and the FIFO queue, to the destination network interface device.

However, in the conventional optical network device, it takes a very long time to transmit data through the switch device, since the opto-electric conversion, serial-to-parallel conversion and decoding are conducted on the input side of the switch device and the encoding, parallel-to-serial conversion and electro-optic conversion are conducted on the output side of the switch device. It causes an increase in latency. In case of an optical network device where error detection and correction are conducted in the switch device, the latency is further increased.

Also, in case the throughput of a signal line is more than one Gbit/s, the number of parallel signal lines after the opto-electric conversion, serial-to-parallel conversion and decoding in the switch device is increased ten to hundred times that of serial signal lines. For example, when a signal line coded with 10B8B code with a throughput of 4 Gbit/s is serial-to-parallel converted down to the frequency of 100 MHz, at which the electric circuit of the switch device can be operated, the number of parallel signal lines becomes 32. In case of another electric circuit with a lower operating frequency, the number of signal lines will be further increased.

As an example, for a 16×16 switch composed of sixteen 4×4 element switches, the required number of signal lines of the input and output pins of the element switch is 256(=32× 8). Including pins necessary for power supply and clock lines, the number is over 300. The number of signal lines of the input and output pins for 8×8 element switches is 512(=32×16). Including pins necessary for the power supply and clock lines, the number is over 600, Since an LSI package with input and output pins more than 500 is very expensive, the scale of an element switch that can be realized by a single LSI is at most 4×4. In general, a switch scale lager than 16×16, which is required for multiprocessors, must be realized by cascading element switch in multistages.

The switch scale of which is enlarged due to such a multistage composition causes a significant increase in latency. With a typical electrical circuit technology, three clocks are required for a signal to pass through an optical transmitter and an optical receiver, and five clocks are required to pass through a 4×4 element switch. Namely, at least 26(=3×2+5×4) clocks are required to pass a signal through such a 16×16 switch device. It therefore causes an increase in latency.

On the other hand, a multistage switch using a plurality of small scale switches is difficult to mount. In the example of the above 16×16 switch, required are sixteen 4×4 element switches, 1024(=32×16×2) switch inputs and outputs and 1536(=32×16×3) link wirings between the element switches.

Furthermore, in the conventional optical network device, since the switch device is asynchronously operated to the respective network interface devices, synchronizing process and asynchronous FIFO queues to adjust timing are needed. It therefore causes a further increase in latency.

Under these circumstances, to multiprocessor systems which are required not only of a high throughput but also of a reduced latency, such a switch device cannot bring a sufficient network performance, and the high-speed and broad-band characteristics of optical fibers cannot be sufficiently utilized therein. Namely, the improvement of the latency characteristic is desired.

SUMMARY OF THE INVENTION

Accordingly, it is an object of the invention to provide an optical network device which have an improved network latency characteristic.

It is a further object of the invention to provide an optical network device in which a switch device has a decreased number of interconnections to facilitate its mounting.

According to the invention, an optical network device for connecting plurality of processors in a multiprocessor system, comprises:

a plurality of network interface devices corresponding to the plurality of processors; and an optical switch device;

wherein each of the plurality of network interface devices comprises an optical transmitter and an optical receiver which are connected with the optical switch device through optical fibers and a network interface control circuit, the optical switch device comprises an optical switch connected with the optical transmitter and the optical receiver and an optical switch control circuit, the network interface control circuit and the optical switch control circuit are connected with each other through a transmission request signal line, a transmission-ending signal line and a transmission-start request signal line, the network interface control circuit sends out a transmission request with an addressee address through the transmission request signal line and notifies the optical switch control circuit of an end of data transmission through the transmission-ending signal line, and the optical switch control circuit arbitrates the transmission request, thereafter switching the optical switch and ordering the network interface control circuit to transmit data through the transmission-start request signal line.

According to another aspect of the invention, an optical network device for connecting a plurality of processors in a multiprocessor system, comprises:

a plurality of network interface devices corresponding to the plurality of processors;

an optical switch device; and a system clock source for supplying system clocks with identical phases through equal-length branches of a clock distribution tree to the network interface device and the optical switch device;

wherein each of the plurality of network interface devices comprises an optical transmitter and an optical receiver which are connected with the optical switch device through an optical fiber and a network interface control circuit, the optical switch device comprises an optical switch connected with the optical transmitter and the optical receiver and an optical switch control circuit, the network interface control circuit and the optical switch control circuit are connected with each other through a transmission request signal line, a transmission-ending signal line and a transmission-start request signal line, the network interface control circuit sends out a transmission request through the transmission request signal line and notifies the optical switch control circuit of an end of data transmission through the transmission-ending signal line, and the optical switch control circuit arbitrates the transmission request, thereafter switching the optical switch and ordering the network interface control circuit to transmit data through the transmission-start request signal line.

According to a further aspect of the invention, an optical network device for connecting a plurality of processors in a multiprocessor system, comprises:

a plurality of network interface devices corresponding to the plurality of processors;

an optical switch device; and a system clock source for supplying system clocks with identical phases through equal-length branches of a clock distribution tree to the network interface device and the optical switch device;

wherein each of the plurality of network interface devices comprises an optical transmitter and an optical receiver which are connected with the optical switch device through an optical fiber and a network interface control circuit, the optical switch device comprises an optical switch connected with the optical transmitter and the optical receiver and an optical switch control circuit, the network interface control circuit and the optical switch control circuit are connected with each other through a transmission request signal line, a transmission-ending signal line, a transmission-start request signal line and a strobe signal line, the network interface control circuit sends out a transmission request through the transmission request signal line and notifies the optical switch control circuit of an end of data transmission through the transmission-ending signal line, and the optical switch control circuit arbitrates the transmission request, thereafter switching the optical switch, ordering the network interface control circuit to transmit data through the transmission-start request signal line and notifying the network interface control circuit on the receiving side of the data validity of a received signal through the strobe signal line.

According to a further aspect of the invention, an optical network device for connecting a plurality of processors in a multiprocessor system, comprises:

a plurality of network interface devices corresponding to the plurality of processors;

an optical switch device; and a system clock source for supplying system clocks with identical phases through equal-length branches of a clock distribution tree to the network interface device and the optical switch device;

wherein each of the plurality of network interface devices comprises an optical transmitter and an optical receiver which are connected with the optical switch device through an optical fiber and a network interface control circuit, the optical switch device comprises an optical switch connected with the optical transmitter and the optical receiver and an optical switch control circuit, the network interface control circuit and the optical switch control circuit are connected with each other through a transmission request signal line, a transmission-ending signal line, a transmission-start request signal line and a strobe signal line, the network interface control circuit sends out a transmission request and a data length through the transmission request signal line and notifies the optical switch control circuit of an end of data transmission through the transmission-ending signal line, and the optical switch control circuit arbitrates the transmission request, thereafter switching the optical switch, ordering the network interface control circuit to transmit data through the transmission-start request signal line, judging a transmission-ending timing from the data length and notifying the network interface control circuit on the receiving side of the data validity of a received signal through the strobe signal line.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical network device in the preferred embodiments, the aforementioned conventional optical network device will be explained in FIGS. 1 to 3.

Figure 1:
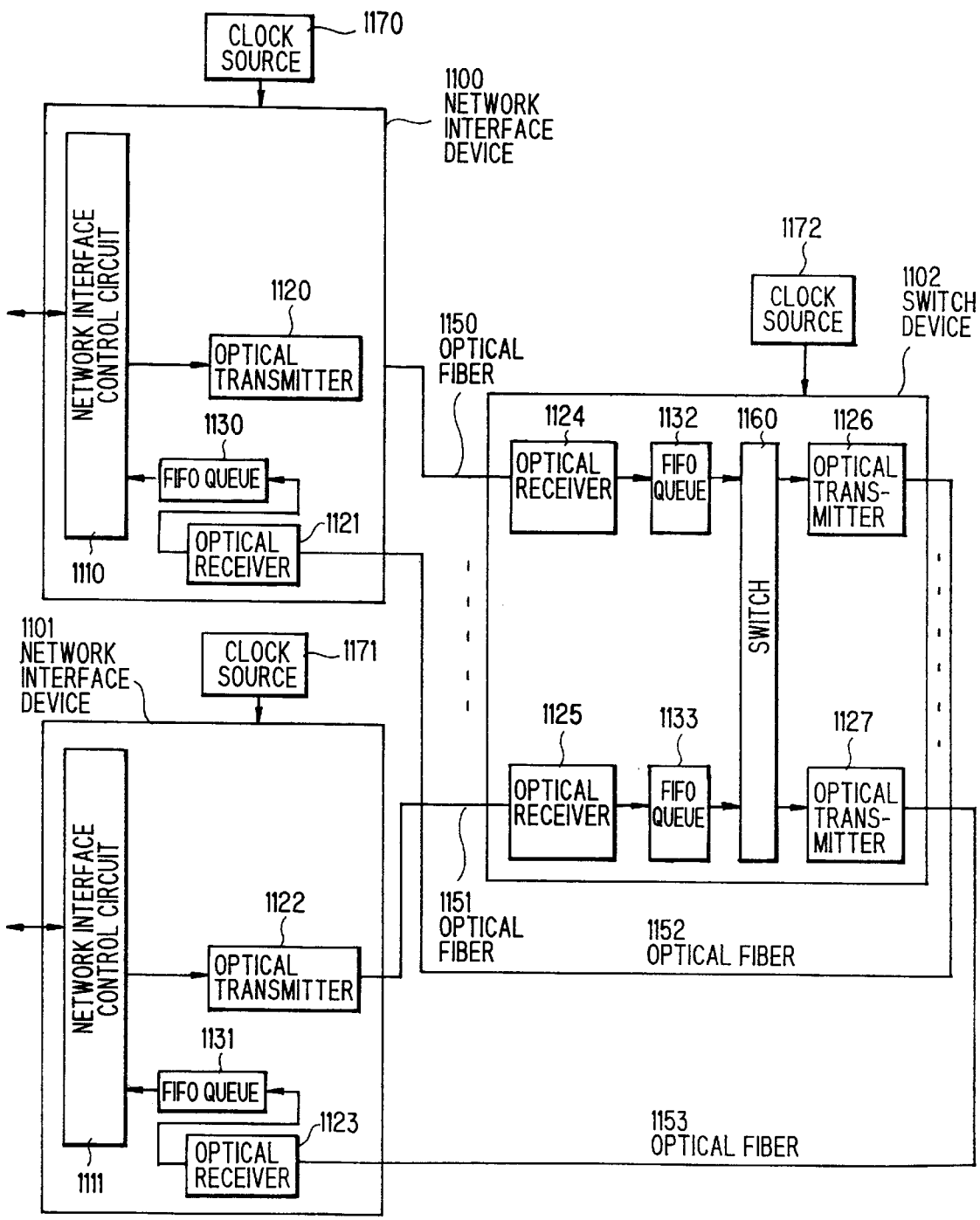
FIG. 1 is a block diagram showing a conventional optical network device.

FIG. 1 shows the composition of a conventional 16×16 optical network device that network interface devices are interconnected by using optical interconnections and switches. In FIG. 1, 1100 and 1101 are network interface devices, 1102 is a switch device, 1110 and 1111 are network interface control circuits, 1160 is a switch, 1120, 1122, 1126 and 1127 are optical transmitters, 1121, 1123, 1124 and 1125 are optical receivers, and 1130 to 1133 are FIFO(first-in first-out) queues. These FIFO queues also serve as asynchronous FIFO queues for absorbing the clock phase difference between the switch device and the respective network interface devices that are asynchronously operated. Also, 1150 to 1153 are optical fibers and 1170 to 1172 are clock sources for the respective devices.

Figure 2:
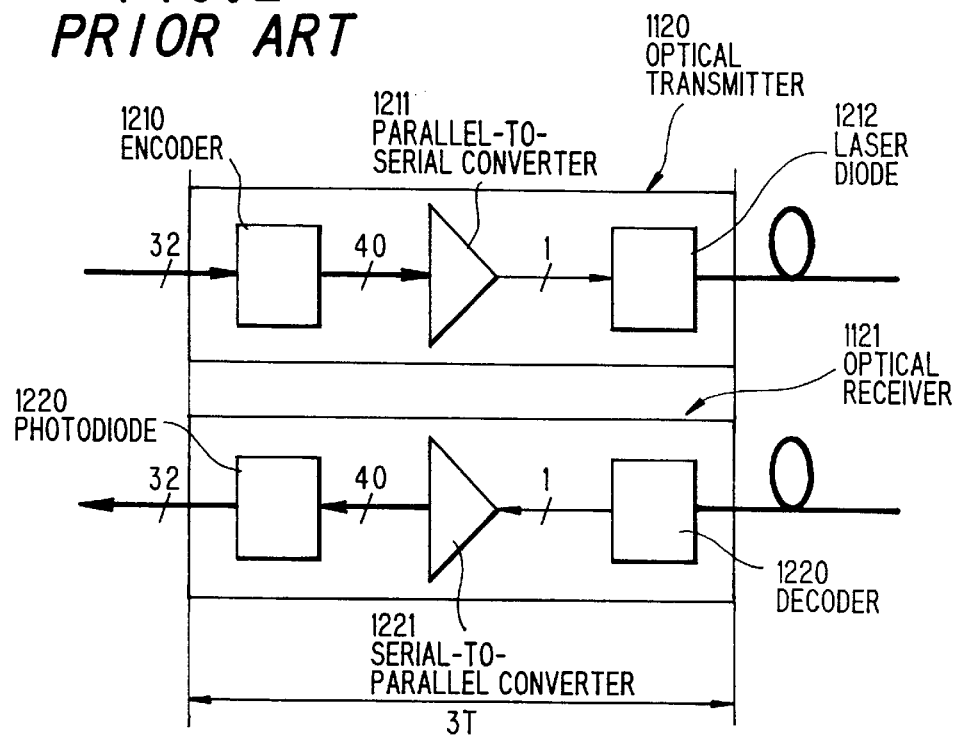
FIG. 2 is a block diagram showing examples of optical transmitters and optical receivers in FIG. 1.

FIG. 2 shows typical compositions of the optical transmitter 1120 and the optical receiver 1121. 1210 is an encoder, where a 8B10B code is generally used. 1211 is a parallel-to-serial converter. 1212 is a laser diode, where an electro-optic conversion is conducted. Herein, an example of 32-bit input and 40-to-1 parallel-to-serial conversion is shown. For example, from 26.5625 MHz×32 bit, a throughput of 1.0625(Gbit/s) can be obtained. 1220 is a decoder, where 10B8B decoding is conducted in response to the encoder 1210. 1221 is a serial-to-parallel converter. 1222 is a photodiode, where an opto-electric conversion is conducted. Herein, an example of 32-bit input and 1-to-40 serial-to-parallel conversion in response to the optical transmitter 1120 is shown.

Figure 3:
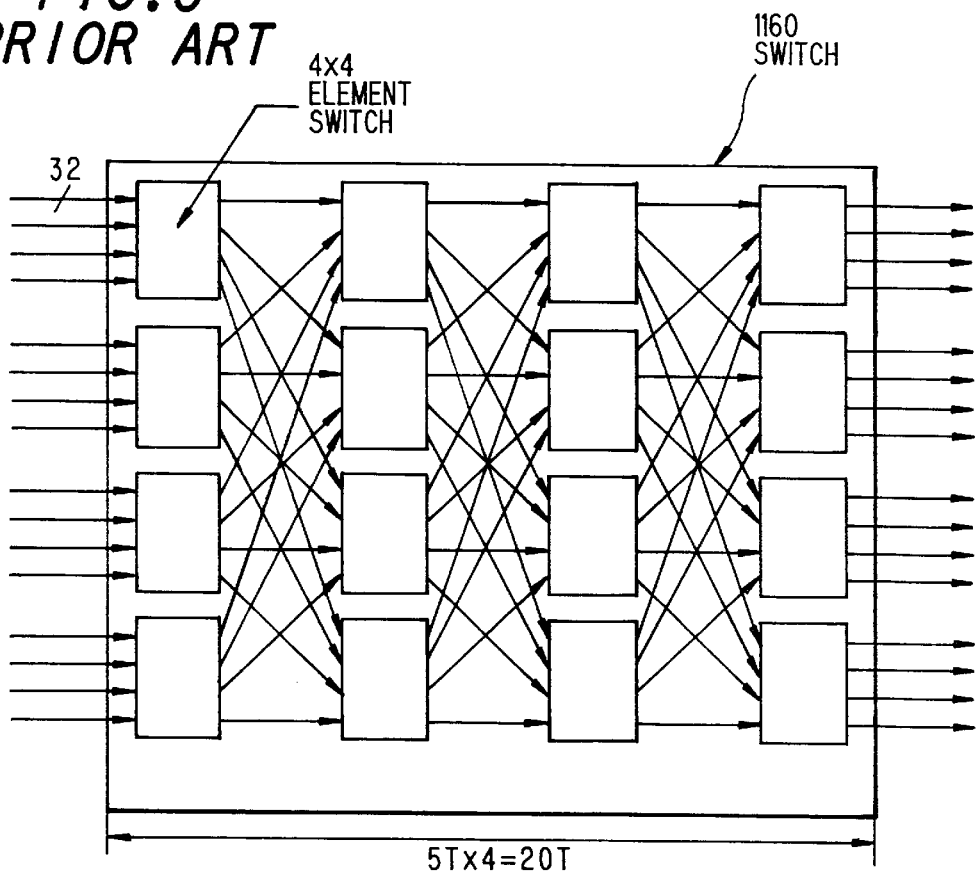
FIG. 3 is a block diagram showing an example of a switch in FIG. 1.

FIG. 3 shows a typical composition of the switch 1160, where sixteen 4×4 element switches are connected to compose a 16×16 switch. Such a switch composition is, for example, described in Proceedings of ISSP(1994), pp.396–401.

Next, an optical network device in the first preferred embodiment according to the invention, which adopts a 16×16 optical switch, will be explained in FIG. 4.

Figure 4:
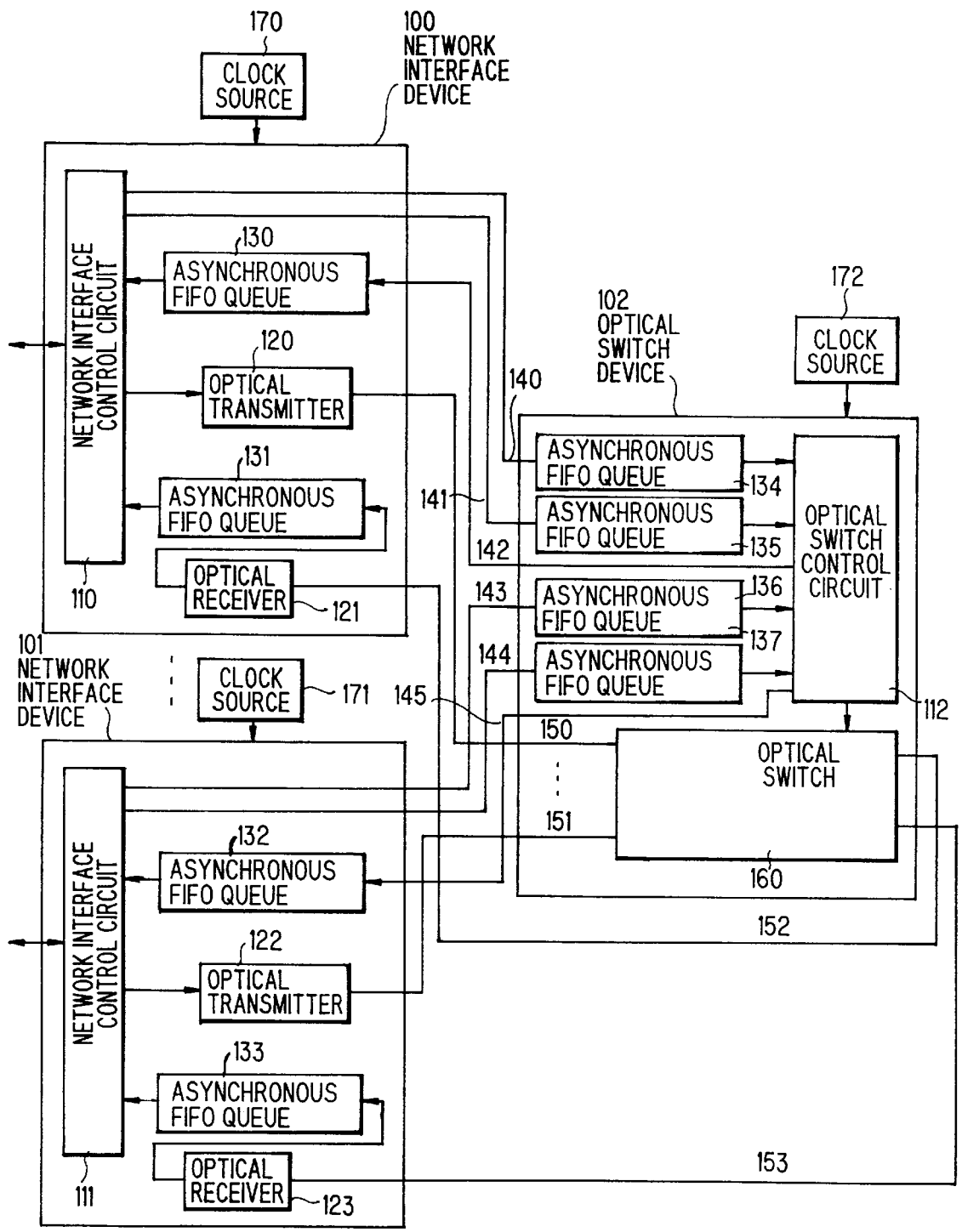
FIG. 4 is a block diagram showing an optical network device in a first preferred embodiment according to the invention.

In FIG. 4, 100 and 101 are network interface devices, 102 is an optical switch device, 120 and 122 are optical transmitters, and 121 and 123 are optical receivers. The optical transmitters and the optical receivers have the same composition as the optical transmitter 1120 and the optical receiver 1121, respectively, in FIG. 1. 110 and 111 are network interface control circuits, 112 is an optical switch control circuit and 160 is an optical switch. 140 and 143 are transmission request signal lines, 141 and 144 are transmission-ending signal lines and 142 and 145 are transmission-start request signal lines. These are control signal lines for connecting and transmission-reception controlling between the network interface control circuits 110, 111 and the optical switch control circuit 112. 150 to 153 are data signal lines, which are of optical fibers. 170 to 172 are clock sources for the respective devices and 130 to 137 are asynchronous FIFO(first-in first-out) queues. The FIFO queues are used to absorb the clock phase difference between the devices when transmitting and receiving a signal.

Figure 5:
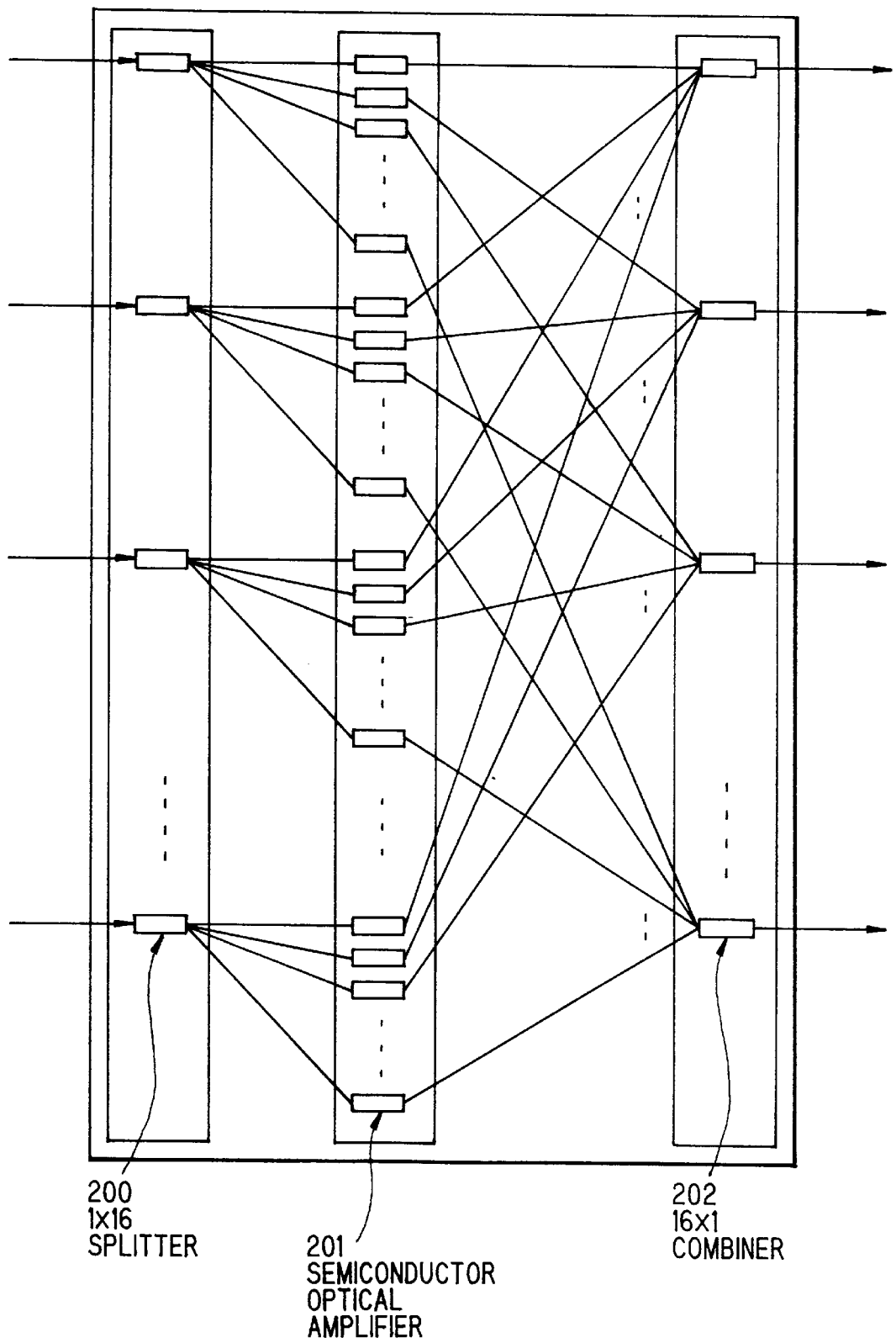
FIG. 5 is a block diagram showing an example of an optical switch in FIG. 4, FIGS. 6A to 6C show an example of signal transmission and reception processing in the first embodiment.

FIG. 5 shows an example of a 16×16 splitter-combiner-type optical switch, where a semiconductor optical amplifier is used as a gate switch. In FIG. 5, 200's are sixteen 1×16 splitters, 201's are two hundred and fifty six semiconductor optical amplifiers and 202's are sixteen 16×1 combiner. Meanwhile, an example of the optical switch that a semiconductor optical amplifier is used as a gate switch is also described in Journal of Lightwave Technologies (1992), pp.383–389.

Figure 6A:
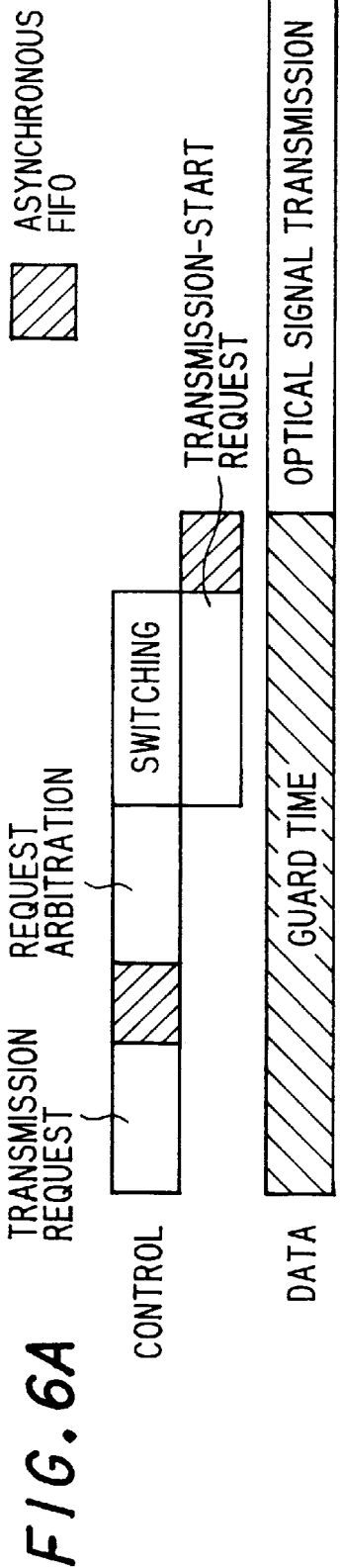

FIG. 6A shows an example of the transmission processing of a signal. The network interface control circuit 110 or 111 sends out a transmission request with an addressee address to optical switch control circuit 112 through the transmission request signal line 140 or 143. The optical switch control circuit 112 conducts the arbitration and optical switching, then sending back a transmission-start request through the transmission-start request line 142 or 145. The optical switching and the sending of the transmission-start request can be parallel conducted. Receiving the transmission-start request, the network interface control circuit 110 or 111 starts the transmission of data. Finally, the network interface control circuit 110 or 111 sends the end of transmission to the optical switch control circuit 112 through the transmission-ending signal line 141 or 144.

Figure 6B:
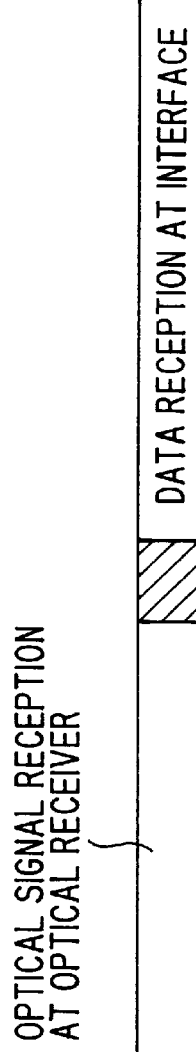
Figure 6C:
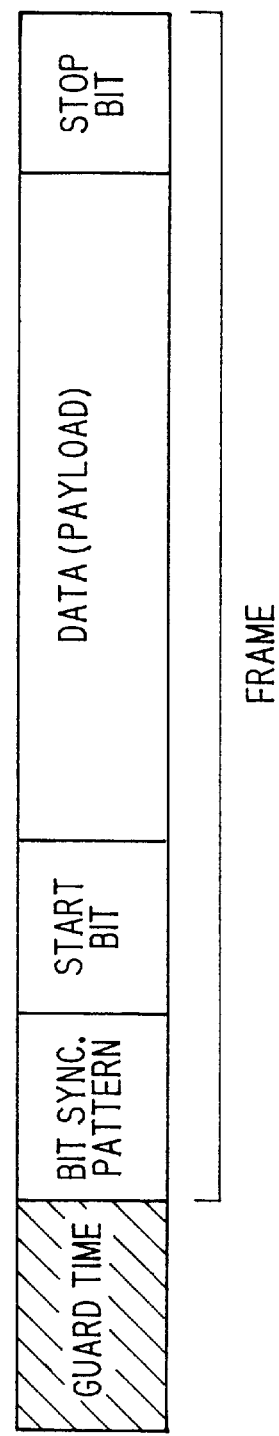

FIG. 6C shows an example of a format of the transmitting signal. It has a frame composition composed of a bit synchronization pattern, a start bit, data and a stop bit.

FIG. 6B shows an example of the reception processing of data. The optical receiver conducts the bit synchronization depending on the bit synchronization pattern and detects the data position by the start bit and the stop bit.

In the first embodiment, two clock are needed for exchanging the control signal between the network interface control circuit 110 or 111 and the optical switch control circuit 112, five clocks are needed for the arbitration and the optical switching at the optical switch control circuit 112 and two clocks are needed as the overhead for the bit synchronization pattern and the start bit that are added to the transmitting data. The time required to pass a signal through the optical switch device 102 is nearly zero. Therefore, the latency becomes less than ten clocks, which is significantly lowered as compared with the 26 clocks in the conventional optical network device.

Furthermore, in the optical switch device 102, no opto-electric conversion and decoding are conducted and the number of signal lines are so much decreased. Moreover, by using the large-scale optical switch, the 16×16 switch can be obtained with the single-stage composition. Therefore, the number of interconnections, the number of element switches and the number of interconnects between the element switches can be significantly decreased or brought to zero, thereby facilitating the mounting.

An optical network device in the second preferred embodiment according to the invention, which adopts a 16×16 optical switch, will be explained in FIG. 7.

Figure 7:
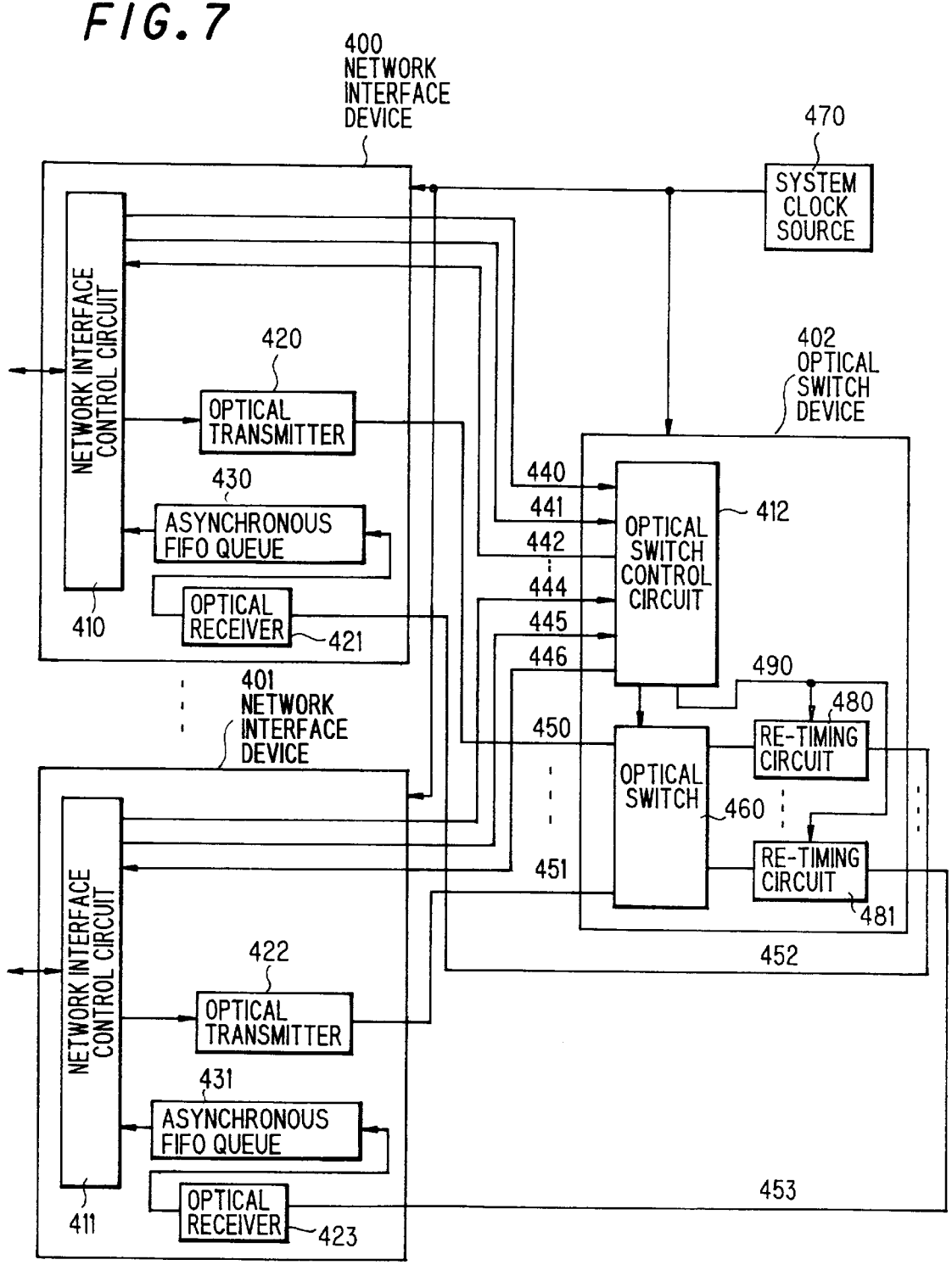
FIG. 7 is a block diagram showing an optical network device in a second preferred embodiment according to the invention.

In FIG. 7, 400 and 401 are network interface devices, 402 is an optical switch device, 420 and 422 are optical transmitters, 421 and 423 are optical receivers, 410 and 411 are network interface control circuits, 412 is an optical switch control circuit and 460 is an optical switch. 440 and 444 are transmission request signal lines, 441 and 445 are transmission-ending signal lines and 442 and 446 are transmission-start request signal lines. These are control signal lines for connecting and transmission-reception controlling between the network interface control circuits 410, 411 and the optical switch control circuit 412. 450 to 453 are data signal lines, which are of optical fibers.

470 is a system clock source, which is distributed with identical phases through equal-length interconnections to the respective network interface devices 400, 401 and the optical switch device 402. The clock distribution is conducted by an electrical signal or optical signal. By the system clock, all the network control circuits composed of the network interface control circuits 410, 411 and the optical switch control circuit 412 are synchronously operated. 480 and 481 are re-timing circuits and 490 is a system clock in the optical switch device 402.

Figure 8:
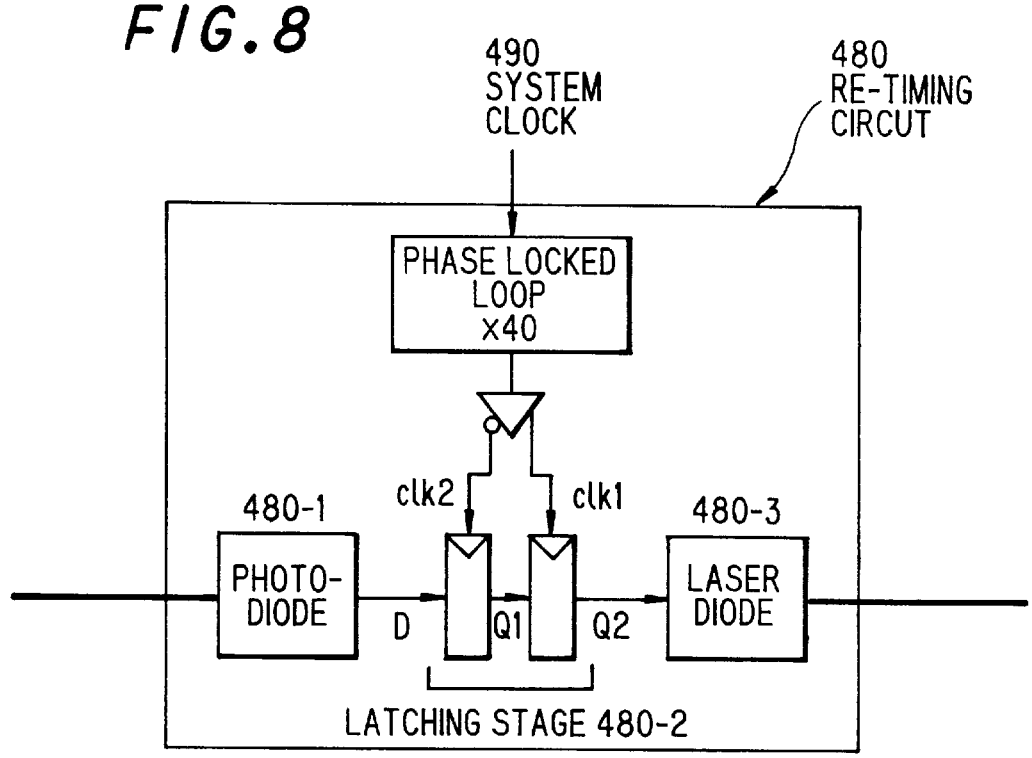
FIG. 8 is a block diagram showing a re-timing circuit in FIG. 7.

FIG. 8 shows an example of the re-timing circuit. The re-timing circuit produces a serial clock that the system clock 490 is multiplied, and the re-timing of the signal passing through the optical switch device is thereby conducted. In FIG. 8, shown is an example of a serial clock whose frequency is forty times that of the system clock, which is matched with the forty-to-one parallel-to-serial conversion at the optical transmitter. After the opto-electric conversion by a photodiode 480-1, the signal is re-timed at a latching stage 480-2 composed of double latches, again electro-optic converted by a laser diode 480-3. Besides, by using an optical latching device, the re-timing may be conducted without the opto-electric conversion.

Figure 9:
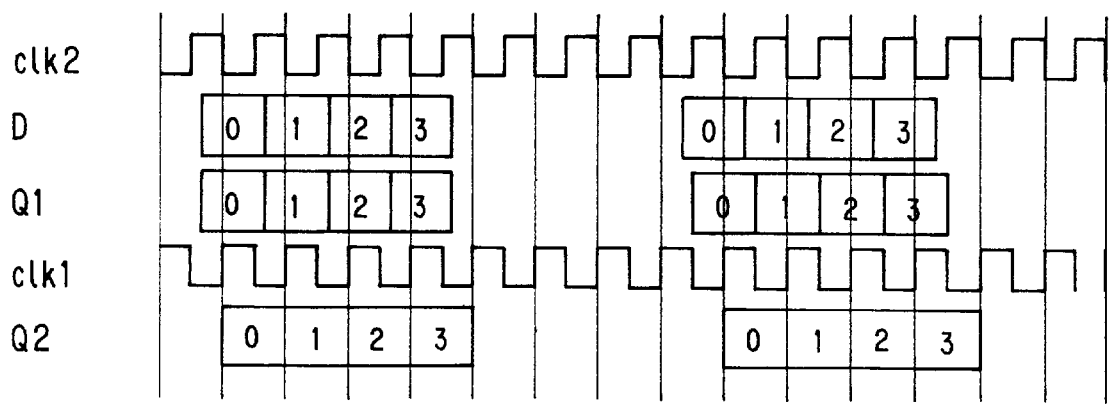
FIG. 9 is a timing chart showing an example of the operation of the re-timing circuit in FIG. 8, FIGS. 10A to 10C show an example of signal transmission and reception processing in the second embodiment.

FIG. 9 shows an example of the operation of the re-timing circuit. By the re-timing circuit, all the data which are transmitted with an arbitrary timing are forced to synchronize with the serial clock of the optical switch device.

FIGS. 10A to 10C show examples of the transmission processing of a signal, a format of the transmitting signal and the reception processing of data, respectively. The basic procedures are the same as those in the first embodiment. Since the entire system is operated synchronously, the asynchronous FIFO queue for the control signal line is not necessary. Also, due to the forced synchronization in the re-timing circuits 480, 481 of the optical switch device 402, the optical receivers 421, 423 do not need to conduct again the bit synchronization after the optical switching. Therefore, the bit synchronization is not necessary. Because of these, in the second embodiment, the latency can be further reduced as compared with that in the first embodiment.

As a modification of the second embodiment, instead of using the re-timing circuit of the optical switch device 402, all the optical fibers from the optical transmitters through the optical switch to the optical receivers may have an equal length. When all the network interface devices on the receiving side are operated synchronizing with the system clock distributed with identical phases through the equal-length interconnections, the bit synchronization can be always obtained since the optical receiver receives an optical signal locked with a constant phase to the system clock. In general, the line lengths of optical fibers can be equalized within a tolerance of around 1 mm, which corresponds to 5 ps skew. This value is sufficient to obtain the stable bit synchronization for up to a throughput of around 10 Gbit/s.

An optical network device in the third preferred embodiment according to the invention, which adopts a 16×16 optical switch, will be explained in FIG. 11.

Figure 11:
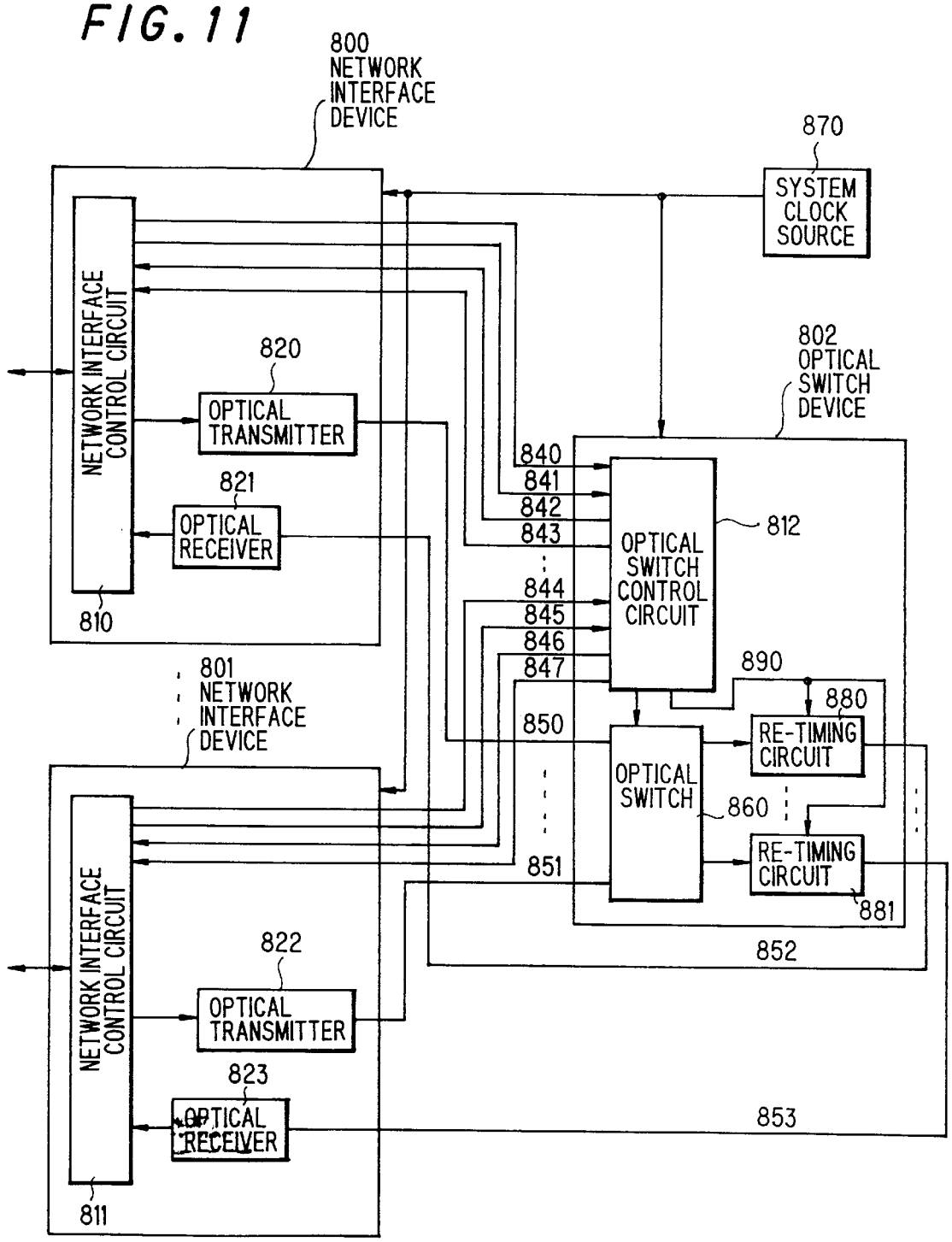
FIG. 11 is a block diagram showing an optical network device in a third preferred embodiment according to the invention.

In FIG. 11, 810 and 811 are network interface control circuits, 812 is an optical switch control circuit, and 860 is an optical switch. 840 and 844 are transmission request signal lines, 841 and 845 are transmission-ending signal lines and 842 and 846 are transmission-start request signal lines. These are control signal lines for connecting and transmission-reception controlling between the network interface control circuits 810, 811 and the optical switch control circuit 812. 850 to 853 are data signal lines, which are of optical fibers.

870 is a system clock source, which is distributed with identical phases through equal-length interconnections to network interface devices 800, 801 and an optical switch device 802. The clock distribution is conducted by an electrical signal or optical signal. By the system clock, all the network control circuits composed of the network interface control circuits 810, 811 and the optical switch control circuit 812 are synchronously operated. 880 and 881 are re-timing circuits and 890 is a system clock in the optical switch device 802.

In the third embodiment, whose device composition is similar to that in the second embodiment, strobe signal lines 843 and 847 are further provided as control signal lines. Furthermore, the line length adjustment of the optical fibers for connecting between the respective network interface devices 800, 801 and the optical switch device 802 is conducted. The line lengths of the optical fibers 850, 851 are adjusted to be equal to each other and to set transmission delay time-of-flight from the parallel-to-serial converters in the optical transmitters 820, 822 to the gate switches of the optical switch 860 to be one clock. Also, the line lengths of the optical fibers 852, 853 for connecting between the optical switch 860 and the respective optical receivers 821, 823 are adjusted to be equal to each other and to set the signal-passing time from the gate switches of the optical switch 860 to the serial-to-parallel in the optical receivers 821, 823 to be one clock. For example, to a system clock of 100 MHz, one clock corresponds to 10 ns and an optical fiber line length of 2 m. As described above, since the line lengths of the optical fibers as data signal lines are thus adjusted and all the control circuits are synchronously operated, it is equivalent to that the entire network device is synchronously operated to the system clock.

Figure 12A:
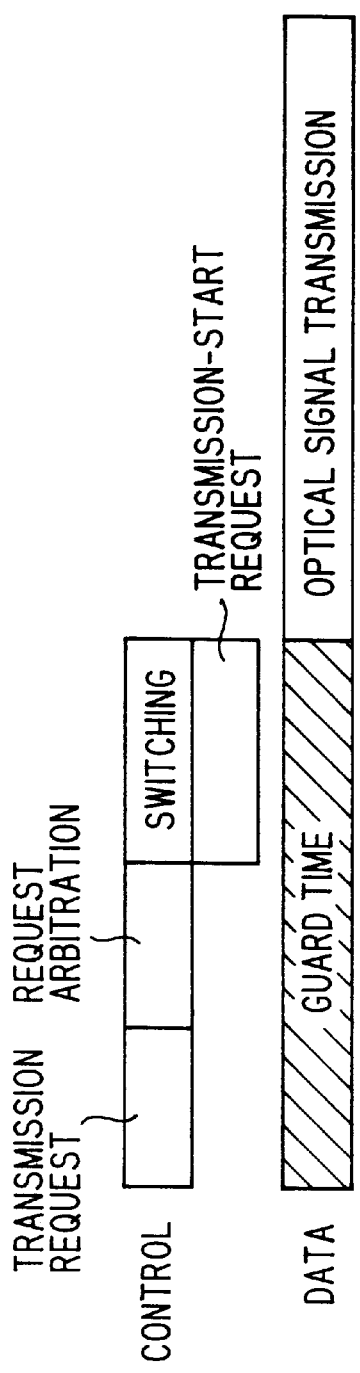
FIGS. 12A to 12C show an example of signal transmission and reception processing in the third embodiment.
Figure 12B:
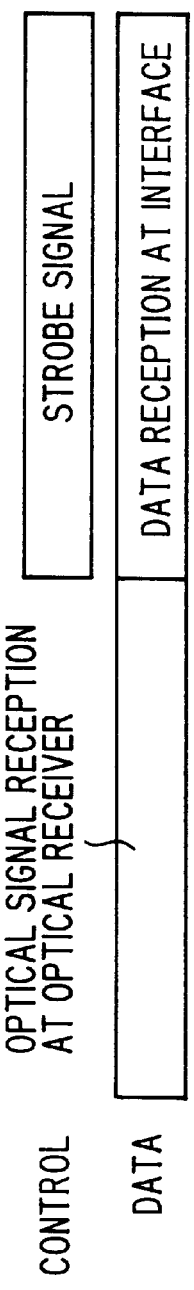
Figure 12C:
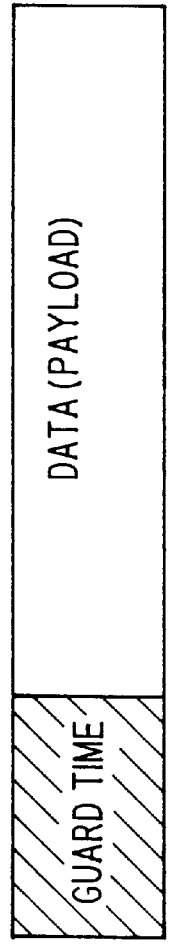

FIGS. 12A to 12C show examples of the transmission processing of a signal, a format of the transmitting signal and the reception processing of data, respectively. The optical switch control circuit 812, in addition to the functions as described in the first and second embodiments, administers the transmission and reception timings of a signal in the respective network interface devices 800, 801. Signals pass through the optical switch device 802 one clock after they are transmitted from the optical transmitters 820, 822 and are received by the optical receivers 821, 823 two clocks after that. Matching with this timing, the optical switch control circuit 812 switches the optical switch 860 and notifies the optical receiver in the network interface device on the receiving side of the arrival timing of data by using the strobe signal line.

Also, receiving the transmission-ending signal from the network interface device on the transmitting side, it notifies the optical receiver of the end of data transmission by using the strobe signal line. By using the strobe signal line, the start bit and stop bit can be eliminated. Also, since the data arrival timings from any optical transmitters are synchronized with the system clock, the asynchronous FIFO queues on the receiving side can be eliminated. Because of these effects, in the third embodiment, the latency can be further reduced.

Figure 13:
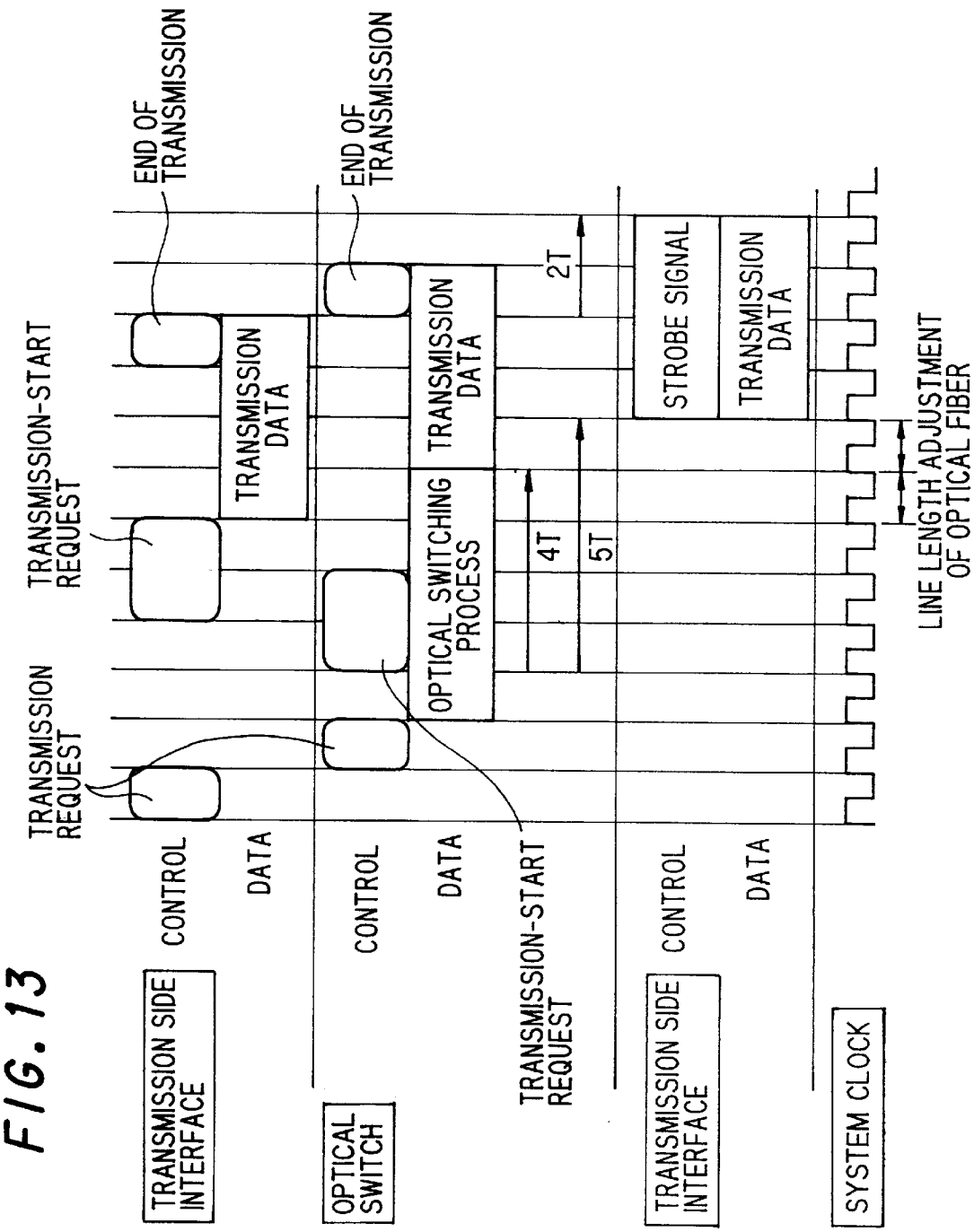
FIG. 13 is a timing chart showing a detailed example of signal transmission and reception processing in the third embodiment.

FIG. 13 shows an example of a detailed timing chart in the transmission processing. In this example, data passes through the optical switch 860 four clocks after the optical switch control circuit 812 sends the transmission-start request back to the network interface device on the transmitting side and is received by the network interface device on the receiving side five clocks after that. Also, two clocks after the optical switch control circuit 812 receives the transmission-ending signal from the network interface device on the transmitting side, the data reception at the network interface device on the receiving side is terminated. The optical switch control circuit 812 operates the strobe signal line at the above-mentioned timings and notifies the network interface device of the validity of data.

Alternatively, the network interface control circuit on the transmitting side may notify the optical switch control circuit of the length of transmitted data with the transmission request signal when requesting the transmission instead of the transmission-ending signal, and the optical switch control circuit may recognize the timing of the end of transmission by the data length and operate the strobe signal line.

On the other hand, in place of the splitter-combiner-type optical switch with the semiconductor optical amplifiers, a lithium niobate matrix switch may be used.

Furthermore, the respective control signals wavelength-multiplexed with data signals may be transmitted and received between the network interface device and the optical switch device through one optical fiber.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical network device for connecting a plurality of processors in a multiprocessor system, comprising:

a plurality of network interface devices corresponding to said plurality of processors; and an optical switch device;

wherein each of said plurality of network interface devices comprises an optical transmitter and an optical receiver which are connected with said optical switch device through optical fibers and a network interface control circuit, said optical switch device comprises an optical switch connected with said optical transmitter and said optical receiver and an optical switch control circuit, said network interface control circuit and said optical switch control circuit are connected with each other through a transmission request signal line, a transmission-ending signal line and a transmission-start request signal line, said network interface control circuit sends out a transmission request with an addressee address through said transmission request signal line and notifies said optical switch control circuit of an end of data transmission through said transmission-ending signal line, and said optical switch control circuit arbitrates said transmission request, thereafter switching said optical switch and ordering said network interface control circuit to transmit data through said transmission-start request signal line.

2. An optical network device for connecting a plurality of processors in a multiprocessor system, comprising:

a plurality of network interface devices corresponding to said plurality of processors;

an optical switch device; and a system clock source for supplying system clocks with identical phases through equal-length branches of a clock distribution tree to said network interface device and said optical switch device;

wherein each of said plurality of network interface devices comprises an optical transmitter and an optical receiver which are connected with said optical switch device through an optical fiber and a network interface control circuit, said optical switch device comprises an optical switch connected with said optical transmitter and said optical receiver and an optical switch control circuit, said network interface control circuit and said optical switch control circuit are connected with each other through a transmission request signal line, a transmission-ending signal line and a transmission-start request signal line, said network interface control circuit sends out a transmission request through said transmission request signal line and notifies said optical switch control circuit of an end of data transmission through said transmission-ending signal line, and said optical switch control circuit arbitrates said transmission request, thereafter switching said optical switch and ordering said network interface control circuit to transmit data through said transmission-start request signal line.

3. An optical network device, according to claim 2, wherein:

said optical switch control circuit comprises an internal clock source which is phase-locked to said system clock and generates an internal clock, and a re-timing circuit which locks a phase of an optical signal to said system clock based on said internal clock, said internal clock source and said re-timing circuit being provided on an input or output side of said optical switch.

4. An optical network device, according to claim 3, wherein:

said re-timing circuit comprises a photodiode which converts said optical signal into an electrical signal, a latch circuit which receives said electrical signal and conducts the re-timing by latching while using said internal clock as a reference clock, and a laser diode which converts an output of said latch circuit into an optical signal.

5. An optical network device, according to claim 2, wherein:

all of said optical fibers from all of said optical transmitter through said optical switch to all of said optical receiver have an equal length to conduct the re-timing of an optical signal.

6. An optical network device, according to claim 5, wherein:

said optical fibers are adjusted to have an equal length such that a signal-passing time from all of said optical transmitters to said optical switch is equal to a product obtained by multiplying a period of said system clock by an integer, and to have an equal length such that a signal-passing time from said optical switch to all of said optical receivers is equal to a product obtained by multiplying a period of said system clock by an integer.

7. An optical network device for connecting a plurality of processors in a multiprocessor system, comprising:

a plurality of network interface devices corresponding to said plurality of processors;

an optical switch device; and a system clock source for supplying system clocks with identical phases through equal-length branches of a clock distribution tree to said network interface device and said optical switch device;

wherein each of said plurality of network interface devices comprises an optical transmitter and an optical receiver which are connected with said optical switch device through an optical fiber and a network interface control circuit, said optical switch device comprises an optical switch connected with said optical transmitter and said optical receiver and an optical switch control circuit, said network interface control circuit and said optical switch control circuit are connected with each other through a transmission request signal line, a transmission-ending signal line, a transmission-start request signal line and a strobe signal line, said network interface control circuit sends out a transmission request through said transmission request signal line and notifies said optical switch control circuit of an end of data transmission through said transmission-ending signal line, and said optical switch control circuit arbitrates said transmission request, thereafter switching said optical switch, ordering said network interface control circuit to transmit data through said transmission-start request signal line and notifying said network interface control circuit on the receiving side of the data validity of a received signal through said strobe signal line.

8. An optical network device, according to claim 7, wherein:

said optical fibers are adjusted to have an equal length such that a signal-passing time from a parallel-to-serial converter in said optical transmitter to a gate switch in said optical switch is equal to one clock, and to have an equal length such that a signal-passing time from said optical switch to all of said optical receivers is equal to one clock.

9. An optical network device for connecting a plurality of processors in a multiprocessor system, comprising:

a plurality of network interface devices corresponding to said plurality of processors;

an optical switch device; and a system clock source for supplying system clocks with identical phases through equal-length branches of a clock distribution tree to said network interface device and said optical switch device;

wherein each of said plurality of network interface devices comprises an optical transmitter and an optical receiver which are connected with said optical switch device through an optical fiber and a network interface control circuit, said optical switch device comprises an optical switch connected with said optical transmitter and said optical receiver and an optical switch control circuit, said network interface control circuit and said optical switch control circuit are connected with each other through a transmission request signal line, a transmission-ending signal line, a transmission-start request signal line and a strobe signal line, said network interface control circuit sends out a transmission request and a data length through said transmission request signal line and notifies said optical switch control circuit of an end of data transmission through said transmission-ending signal line, and said optical switch control circuit arbitrates said transmission request, thereafter switching said optical switch, ordering said network interface control circuit to transmit data through said transmission-start request signal line, determining a transmission-ending timing from said data length and notifying said network interface control circuit on the receiving side of the data validity of a received signal through said strobe signal line.

* * * * *

UNITED STATES PATENT AND TRADEMARK OFFICE
CERTIFICATE OF CORRECTION

PATENT NO. : 5,905,587
DATED : May 18, 1999
INVENTOR(S) : Yoshiharu Maeno, et al.

It is certified that error appears in the above-identified patent and that said Letters Patent is hereby corrected as shown below:

On The Title Page, [56] References Cited: Insert
--6-244932  9/2/94   Japan
  5-260541  10/8/93  Japan
  1-122236  5/15/89  Japan
  4-216292  8/6/92   Japan--

Signed and Sealed this

Fifth Day of September, 2000

Attest:

Q. TODD DICKINSON

Attesting Officer

Director of Patents and Trademarks